(12) United States Patent
Hygate

(10) Patent No.: US 8,562,841 B1
(45) Date of Patent: Oct. 22, 2013

(54) GLYCERINE-BIODIESEL CONTINUOUS FLOW SEPARATOR AND METHODOLOGY OF USE

(76) Inventor: James Philip Hygate, Stonehouse (GB)

( * ) Notice: Subject to any disclaimer, the term of this patent is extended or adjusted under 35 U.S.C. 154(b) by 553 days.

(21) Appl. No.: 12/730,118

(22) Filed: Mar. 23, 2010

Related U.S. Application Data

(60) Provisional application No. 61/162,663, filed on Mar. 23, 2009.

(51) Int. Cl.
*C02F 9/02* (2006.01)

(52) U.S. Cl.
USPC ........... 210/802; 210/521; 210/522; 210/534; 210/538; 210/540; 210/746; 210/801

(58) Field of Classification Search
USPC ......... 210/522, 534, 521, 538, 540, 746, 801, 210/DIG. 5, 532.1, 532.2, 802
See application file for complete search history.

(56) References Cited

U.S. PATENT DOCUMENTS

| | | | | |
|---|---|---|---|---|
| 4,437,988 A * | 3/1984 | James | ............................ | 210/237 |
| 4,897,206 A * | 1/1990 | Castelli | .......................... | 210/791 |
| 5,068,035 A * | 11/1991 | Mohr | ............................ | 210/236 |
| 5,520,825 A * | 5/1996 | Rice | ............................ | 210/802 |
| 5,762,810 A * | 6/1998 | Pelton et al. | .................... | 210/799 |
| 6,537,458 B1* | 3/2003 | Polderman | ..................... | 210/801 |
| 2005/0173337 A1* | 8/2005 | Costinel | ........................ | 210/519 |
| 2007/0045200 A1* | 3/2007 | Moon et al. | ..................... | 210/767 |
| 2008/0011693 A1* | 1/2008 | Li et al. | .......................... | 210/802 |
| 2009/0300973 A1* | 12/2009 | Ashley | ............................ | 44/308 |

\* cited by examiner

*Primary Examiner* — Duane Smith
*Assistant Examiner* — Paul J Durand
(74) *Attorney, Agent, or Firm* — Long & Chybik; John D. Long

(57) ABSTRACT

One possible embodiment of the invention could be a continuous flow separator for biodiesel formation and a method of operating same. The separator could comprise tank with hollow interior forming a main compartment, a weir-formed compartment, and a sump, the weir being formed at one end of the tank, the sump being formed in the tank bottom, the main compartment being located over the sump; a set of horizontally stacked plates received within the main compartment over the sump, each plate features a series of conical structures, cone apertures, and trough apertures; wherein the plates are so configured and stacked that the cone apertures align to form series of cone aperture columns while the trough apertures align to form series of trough aperture columns. The biodiesel moves up the cone aperture columns over a weir into the separate compartment while glycerine descends the trough aperture columns to the sump.

14 Claims, 5 Drawing Sheets

GLYCERINE-BIODIESEL CONTINUOUS
FLOW SEPARATOR AND METHODOLOGY
OF USE

CROSS-REFERENCES TO RELATED
APPLICATIONS

This application claims the benefit under 35 U.S.C. §119 (e) of U.S. Provisional Patent Application No. 61/162,663, filed on Mar. 23, 2009, the contents of which are relied upon and incorporated by reference.

STATEMENT REGARDING FEDERALLY
SPONSORED RESEARCH OR DEVELOPMENT

Not Applicable

REFERENCE TO A "MICROFICHE APPENDIX"

Not Applicable.

FIELD OF THE INVENTION

The present invention relates to separators that separate resultant light phase biodiesel (methyl, propyl, or ethyl esters) from the heavier phase crude glycerine as made in biodiesel production. In particular, the invention relates to those glycerine-biodiesel separators that are continuous flow separators.

BACKGROUND

This could be considered an age where a premium could be placed on developing economical and commercially feasible alternative fuels such as biodiesel. Biodiesel may be typically a mixture of long chain alkyl (i.e., methyl, propyl or ethyl) esters generally having qualities similar to petroleum-derived diesel fuel and could be used in powering unmodified diesel engines. Biodiesel, hence it name, is derived from the chemical treatment (e.g., transesterification) of renewable non-petroleum based organic materials (e.g., oils made from vegetable oils, animal fats, crushings of certain seed types, and the like). In one possible version of biodiesel, the biodiesel could be made as a result of a transesterification of triglyceride oil supplied by a bio-renewable source (e.g., rape seed crushings).

One possible system and methodology for batch production of biodiesel could have a first stage wherein raw, renewable, organic material could be processed into useable feed stock oil. This stage could include a seed crushing capability and a follow-on oil extractor/filter capacity to produce feedstock oil. This stage could further include the ability to treat and reduce the presence of undesired free fatty acids found in the newly created feedstock oil. This ability could convert the undesired free fatty acids into soap and then remove the soap from the biodiesel manufacturing process. Alternatively, the methodology could use an acidic catalyst to covert the free fatty acids into the esterified free fatty acids that can be consumed in the latter stages of process.

The next stage could have the resultant feedstock oil fed through an insulated tank having a heating unit wherein the feedstock oil could be generally held and heated to a prescribed temperature (e.g., approximately 120° C.). The heating process boils off most of the water present in the feedstock oil. If water is left in the feedstock oil as the oil is further processed, the water present could result in a saponification (soap formation) that inhibits the transesterification reaction.

At the next stage, the heated and purified feedstock oil may then be placed into a transesterification chamber or reactor where the transesterification process [e.g., the triglyceride of the feedstock oil reacts with alcohol (i.e., ethanol) in the presence of the catalyst potassium or sodium methylate] occurs. The alcohol reacts with the fatty acids to form the mono-alkyl esters (e.g., biodiesel) and crude glycerine (a/k/a glycerin, glycerol). The use of significant amounts of alcohol further aids to drive the overall reaction (which is reversible) between the feed stock and the alcohol to completion. Once the reaction is driven to completion, it may form a liquid mixture or solution of heavy phase glycerine and light phase biodiesel/alcohol mixture.

At the next stage, the glycerine-biodiesel mixture could then be transferred to separation module, which in one version could be one or more settling or holding tanks Once the mixture is placed in the tanks, the mixture normally substantially separates (by gravity) into two phases or fractions (e.g., a heavy fraction and a light fraction) over a period of time with, expectedly, the 'heavy' fraction of glycerine forming the bottom portion while the 'light' fraction of biodiesel forms the top portion of the mixture. Once this separation generally has taken place, the lighter fraction biodiesel can be siphoned off the top of the solution while the heaver fraction glycerine can be pumped out from the bottom of the tank.

Another means to separate out the two fractions efficiently and in relatively high purity may be through the employment of powerful and large capacity centrifuges that generally separate the two components in a much quicker fashion than the tank means. These centrifuges may need to be specifically constructed to prevent sparking/electrostatic discharge and otherwise handle/vent explosive gases from volatile liquids (e.g. methanol) that could occur during separation process.

After separation, the resultant biodiesel fraction could be further purified through the final stage by passed it through a heating module (another heating tank) to remove any residual methanol. The biodiesel can then be passed to a purification module to remove any remaining catalyst and resultant soaps that may still have formed. The purification module in one instance can employ a resin ion exchange column to remove any remaining catalyst and residual soaps. At this point, the collected biodiesel has generally reached of level of refinement that substantially allows it to meet the necessary commercial standards for sale and distribution of biodiesel in the market place.

One of the limitations of this biodiesel manufacturing process and system can be seen in the separation process/module, which generally requires a means of separation that are non-continuous (e.g., settling/holding tanks and/or centrifuges). The use of the settling tank system may require a setup having a large footprint (with resultant relatively high construction, operation, and housing costs) to accommodate several tanks need to handle several mixtures of various batches for ongoing biodiesel production. Conversely, if the system only has limited tank capacity, then biodiesel production may have to be halted until separation has occurred in the tank(s) and fractions have been drained off to allow the tank(s) to receive a new biodiesel-glycerine mixture batch.

When the separation process relies on the use of centrifuges, these centrifuges tend to be generally large in size and especially built to handle the separation of alcohol which can be very dangerous (e.g., explosive) if not properly handled (e.g., vented). Such machines could be very expensive (e.g., to obtain and operate) and as a result could make the biodiesel manufacturing process commercially unfeasible.

What is needed there for is a simple, cost-effective, continuous flow separator and respective process of use for same that provides a significantly high fraction purity yield separation of glycerine from the biodiesel, while utilizing a small footprint and generally requiring one unit per processing unit.

SUMMARY OF ONE EMBODIMENT OF THE INVENTION

Advantages of One or More Embodiments of the Present Invention

The various embodiments of the present invention may, but do not necessarily, achieve one or more of the following advantages:

provide a continuous separator that is scalable to accomplish the separation of glycerine-biodiesel mixture into glycerine and biodiesel fractions in a short period of time regardless of the volume of the glycerine-biodiesel mixture input;

the ability to continuously separate the glycerine-biodiesel mixture of a biodiesel manufacturing process into glycerine and biodiesel fractions;

provide a biodiesel-glycerine mixture separator having a relative small footprint in comparison to other separator means;

the ability to use fluid action passing through a multiple conical interface to separate glycerine-biodiesel mixture to glycerine and biodiesel fractions;

provide a glycerine-biodiesel mixture separator that is economical to construct and run;

the ability to separate a glycerine-biodiesel mixture into glycerine and biodiesel fractions that are directed into two different and separate compartments;

the ability to detect the differences between glycerine and biodiesel fractions of the glycerine-biodiesel mixture to control the removal of glycerine from a glycerine-biodiesel mixture separator;

provide an electrical conductivity/resistance means to detect a sufficient concentration of glycerine in the bottom of the continuous flow glycerine-biodiesel mixture separator tank; and provide an electrical conductivity/resistance probe to generally control the sump drain of the sump of the glycerine-biodiesel mixture separator tank.

These and other advantages may be realized by reference to the remaining portions of the specification, claims, and abstract.

Brief Description of One Embodiment of the Present Invention

One possible embodiment could be a continuous flow separator for biodiesel formation comprising a tank forming a hollow interior further comprising a main compartment, weir-formed separate compartment, and a sump, the weir-formed separate compartment is formed at an end of the tank, the sump is formed at the bottom of the tank, the main compartment is located over the sump; a set of horizontally stacked plates placed in the main compartment and set over the sump, each plate features a set of conical structures and at an apex of the conical structure is a cone aperture while proximate to the base of the cone is at least one trough aperture; wherein the plates are configured and stacked to align the cone apertures into series of cone aperture columns and to align the trough apertures into a series of trough aperture columns.

Another possible embodiment could be a methodology for operating a continuous flow separator for biodiesel formation comprising of the following steps but not necessarily in the order shown, providing a tank having a main compartment, a weir-formed separate compartment and a sump, the sump supporting a set of horizontally stacked plates, each plate having a set of conical structures, a set of trough apertures, and a set of cone apertures, the cone aperture being located at the apex of the conical structures while the trough apertures are located at the base of the conical structures, aligning the set of cone apertures to form a series of cone aperture columns, aligning the set of trough apertures to form a series of trough aperture columns; moving the glycerine-biodiesel mixture across the plates; moving bio-diesel up towards the conical structures, through the conical apertures and into the series of cone aperture columns and over the weir; and moving glycerine down through the series of trough aperture columns into the sump.

Another possible embodiment could be a continuous flow separator for biodiesel formation comprising a tank having a hollow interior further denoting a main compartment, a weir formed separate compartment, at one end of the tank, a sump being formed in the bottom of the tank with a probe that can measure the conductivity or resistance of liquid present in the sump, the tank receiving a set of horizontally-stacked plate set over the sump, wherein each plate features a series of conical structures, at an apex of the conical structure is a cone aperture and proximate to the base of the conical structure is at least one trough aperture; the plates are so configured and stacked to align cone apertures line into a series of cone aperture columns to align the trough apertures into a series of trough aperture columns.

The above-description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

Figure 1:
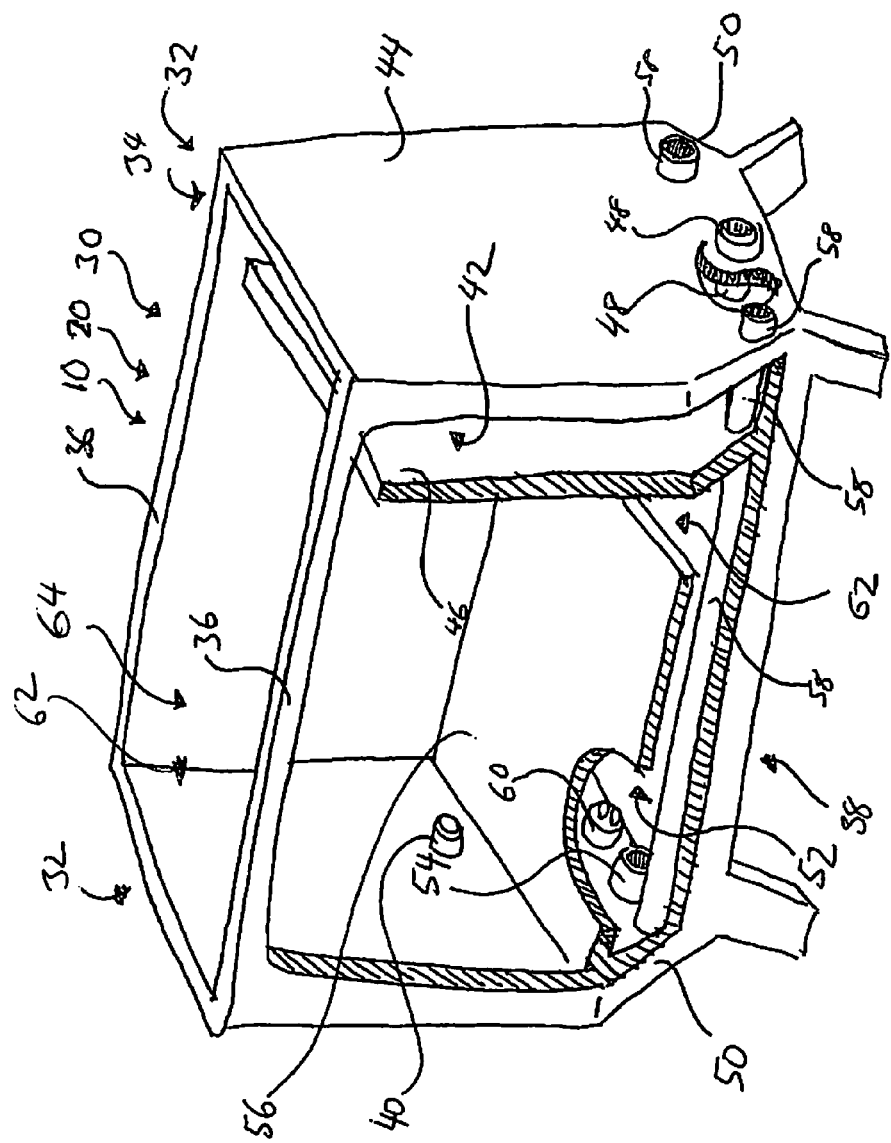
FIG. 1 is substantially a cutaway view of one embodiment of tank of the present invention.

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention 10 in one embodiment could be glycerine-biodiesel mixture continuous flow separator 20 and a methodology for its use 200. As substantially shown in FIG. 4, the continuous flow separator 20 could be comprised of tank 30 with removable lid 110 and one or more sets of stacked plates 80 placed within the generally hollow interior 62 of the tank 30. The hollow interior 62 could be subdivided into a main compartment 64, weir-formed separate compartment 42 and a sump 52.

As substantially shown in FIG. 1, the tank 30, being of suitable size, design, material, and the like, could have a front end 32, a back 34 end, two insulated side walls 36 (to help retain heat of liquid mixture 300 inside the tank 30), and a bottom 38. The front end 32 and back end 34 are connected to another by the side walls 36 and the bottom 38 is continuously connected to front end 32, back end 34, and side walls 36. The front end 32 could further comprise an input port 40 whose passage generally connects to a transesterification reactor (not shown), the passage being controlled by an input valve (not shown).

The open-topped, weir-formed separate compartment 42 could be proximate to the back end 34 and formed by the weir 46 (e.g., a separate wall traversing the width of the tank's interior 62) and a back wall 44. The weir-formed separate compartment 42 could have its weir 46 with a height that is generally smaller than the walls of the tank 30 but that is generally slightly higher than the top of the set(s) of stacked plates 80 as placed in the tank 30. The back wall 44 could further feature an output port 48, whose passage is also controlled by a weir valve (not shown), that can penetrate the wall of the tank to connect the exterior with the interior of the separate compartment 42 to allow remove the contents (e.g., the lighter fraction of biodiesel) as found in the weir-formed compartment 42. In at least one instance, this output port 48 could be regulated by the weir valve (not shown) as generally controlled by a float switch (not shown) appropriately located proximate to the interior of the separate compartment 42. The float switch could help regulate the removal of lighter fraction liquid (biodiesel) from separate compartment 42 when the separate compartment 42 fills up with the lighter fraction from the tank main compartment and to otherwise shut off the output port 48 when there is an insufficient amount of lighter fraction in the separate compartment 42 to be drained off.

The bottom 38 could in at least one embodiment have canted longitudinal sides 50 that generally form or denote a well or sump 52. A sump drain 54, as controlled by a sump valve (not shown), could penetrate the bottom 38 or front end 32 (proximate to the bottom 38) to allow contents within the sump 52 to be generally removed from the tank 30. Directly above this sump 52 could be a horizontally-oriented shelf 56 generally connected to the front end 32 and insulated side walls 36. The end of the shelf 56 facing the weir 46 could generally not contact the weir 46 and to create a sump aperture 62 to allow appropriate fluids (e.g., the heavier fracture of glycerine) to collect into the sump 52. The shelf 56 could also be constructed to support one or more set of stacked plates 80. The sump 52 could further comprise an integral heating means 58 (e.g. hot water pipes) to prevent solidification of the glycerine.

The sump 52 could further comprise of an electric conductivity detector/probe 60 that can be used to control the sump valve (not shown) and hence the sump drain 54. The probe 60 could be located above the sump drain 54 and could project in the sump 52 to come into contact with liquid in the sump 52 to generally allow the probe 60 to substantially measure the electrical resistance/conductivity of the liquid present in the sump 52. Glycerine, which is highly polar and electrically conductive, in the presence of the probe 60 could show low resistance and high conductivity (in comparison to biodiesel). Biodiesel (which is generally not considered polar and has respective insulating properties) in the presence of the probe 60 could register higher resistance and lower conductivity (in comparison to glycerine). When the liquid in the sump 52 registers relatively lower resistance/higher conductivity (in comparison to biodiesel), this would indicate that the presence of a significantly higher concentration of glycerine and could create a signal that the sump drain 54 should be opened and the liquid (e.g., high concentration glycerine) could be pumped out of the sump 52. When the liquid in the sump 52 registers a significantly higher resistance/lower conductivity (in comparison to glycerine) with the probe, this could indicate that sump liquid has a significantly lower concentration of glycerine (e.g., a higher concentration of undesired [for the sump] of biodiesel) and that the sump drain 54 could be closed to generally prevent the liquid in the sump 52 from being removed.

Figure 3:
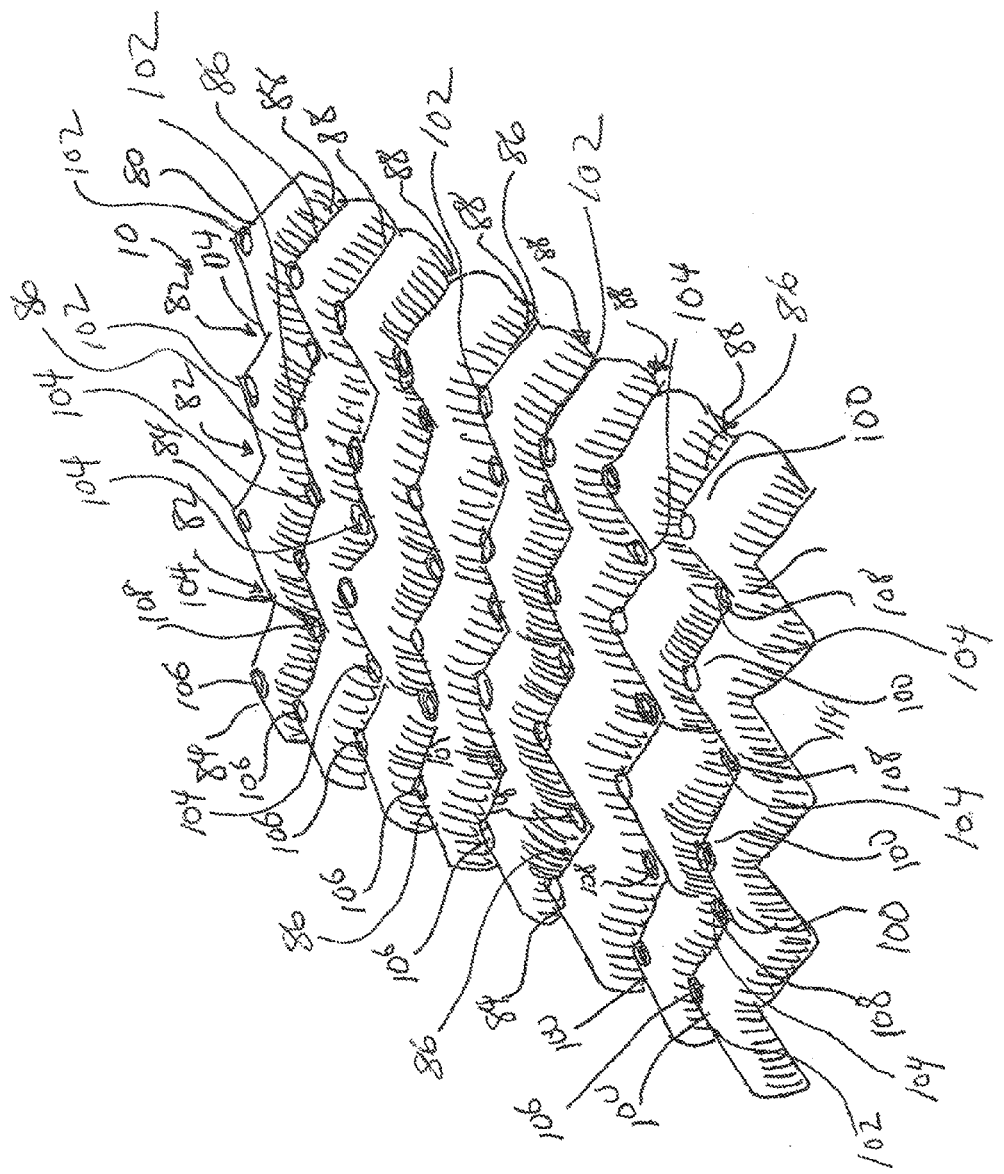
FIG. 3 is substantially a cutaway view of one embodiment of one plate of the present invention.
Figure 4:
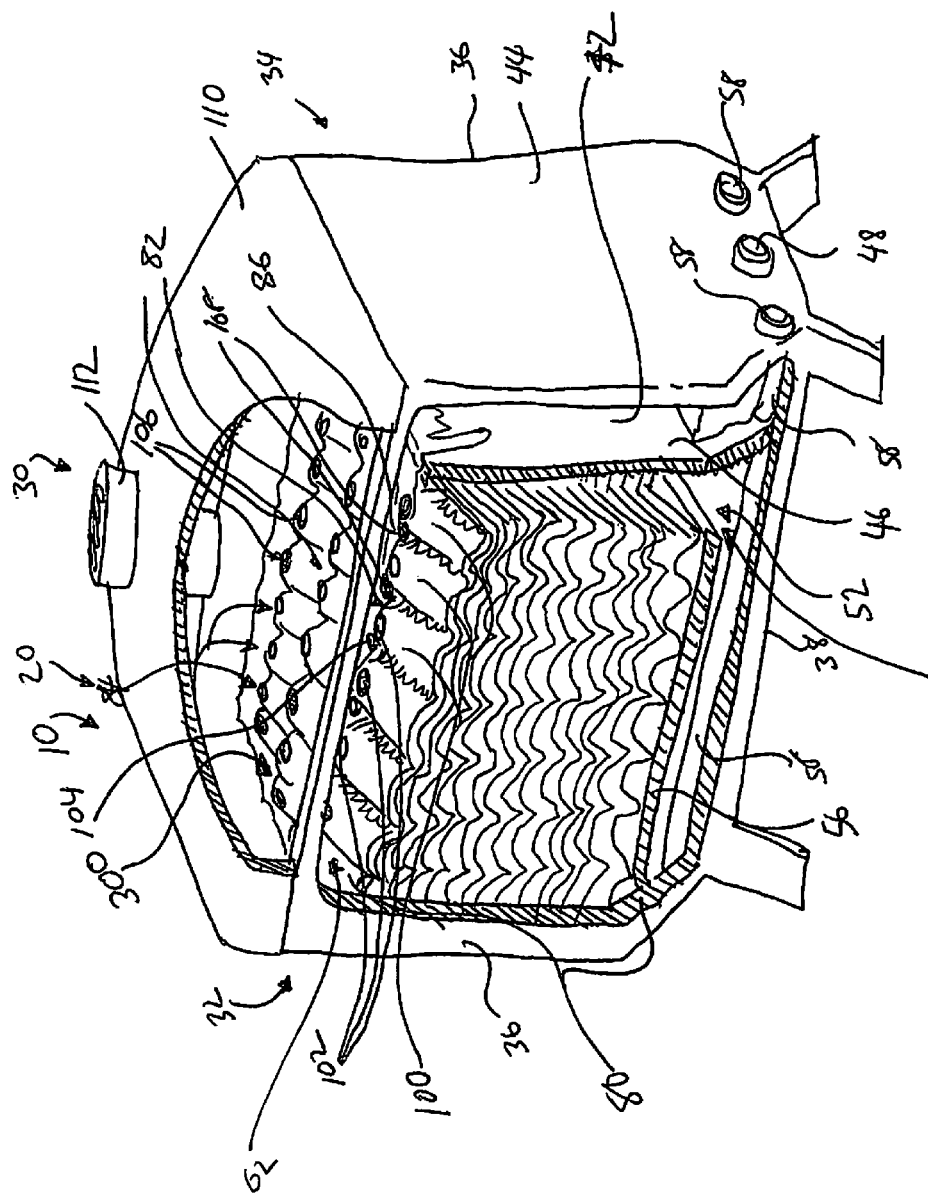
FIG. 4 is substantially a cutaway view of one embodiment of the tank, lid, and stacked plates of the present invention.

As substantially shown in FIGS. 3 and 4, there could be placed within the tank 30 at least one set of horizontally stacked plates 80 resting upon the shelf 56. Each plate 80 generally having a series of evenly-spaced longitudinally folds 82 with resulting peaks 84 and troughs 86. Each plate 80 could further feature a set of evenly spaced lateral folds 88 that could generally combine with the longitudinal folds 82 to substantially form a series of conical structures 100 on each the longitudinal folds 82. Each conical structure 100 could have a cone aperture 102 at its apex while the each trough 86 could feature a series of trough apertures 104. The trough aperture 104 could be found at the junctions of the lateral folds 88 and longitudinal fold troughs 86 (e.g. at the base of the conical structure 100.) When the plates 80 are generally horizontally stacked, the set of conical apertures 102 could be aligned (e.g., lined up) to generally form a series of conical apertures columns 106. The respective trough apertures 104 could also be aligned to generally form a series of trough apertures columns 108. The height of the stacked plates 80 (as placed in the tank 30 as substantially shown in FIG. 4) could be such that the top plate 80 could be located just below the top of the walls of the tank 30 and the top of the weir 46.

As substantially shown in FIG. 4, when the plates 80 are placed in the tank 30, they are orientated to have their longitudinal folds be generally planar with the side walls 36 of the tank 30 to generally form channels that the glycerine-biodiesel mixture would move along during the separation process. One or more clamping or locking mechanisms (not shown) can be employed to hold the set(s) of plates 80 in place within the tank 30.

The size of the tank 30 and the number of plates 80 generally determines the flow rate of biodiesel-glycerine mixture through the separator 20. The separator 20 could allow, in at least one embodiment, to allow a flow rate of up to 35 liters per minute providing a 97% rate of separation of biodiesel to glycerine.

The tank 30 is generally kept filled with liquid mixture 300 (e.g., from the transesterification reactor-not shown). As new and generally unseparated biodiesel-glycerine mixture 300 from the transesterification reactor substantially enters the tank 30 through the input port 40, the orientation and configuration of the plates 80 substantially allows this mixture to subsequently flow between the plates 80. As the moving mixture encounters the conical structures 100, it moves the lighter fraction of the biodiesel up sides of the conical structures 100 (e.g., into a stack of conical structures 100 and their respectively aligned cone apertures 102) to be substantially projected upwards into the respective conical aperture column 106 and towards the top of the tank 30. In this manner, the lighter fraction of biodiesel is directed up and forwards to, and over, the weir 46 to be generally collected in the separate compartment 42.

At the same time, the movement of the mixture relative to the conical structures 100 generally forces the heaver fraction of glycerine out of the conical apertures 102/cone aperture column 106 to allow the glycerine portion of the mixture to substantially coalesce into globules which then move down the outside of the conical structures 100 to reach the trough apertures 104 at the bases (e.g. the junctions of the lateral folds 88 and longitudinal fold troughs 86) of the conical structures 100. As the globules enter the trough apertures 104, they generally move down through the respective trough aperture columns 106 onto the horizontal shelf 56. The horizontal shelf 56 may substantially direct the heavier fraction of glycerine to pass through the sump aperture 57 to generally collect in the sump 52.

Figure 2:
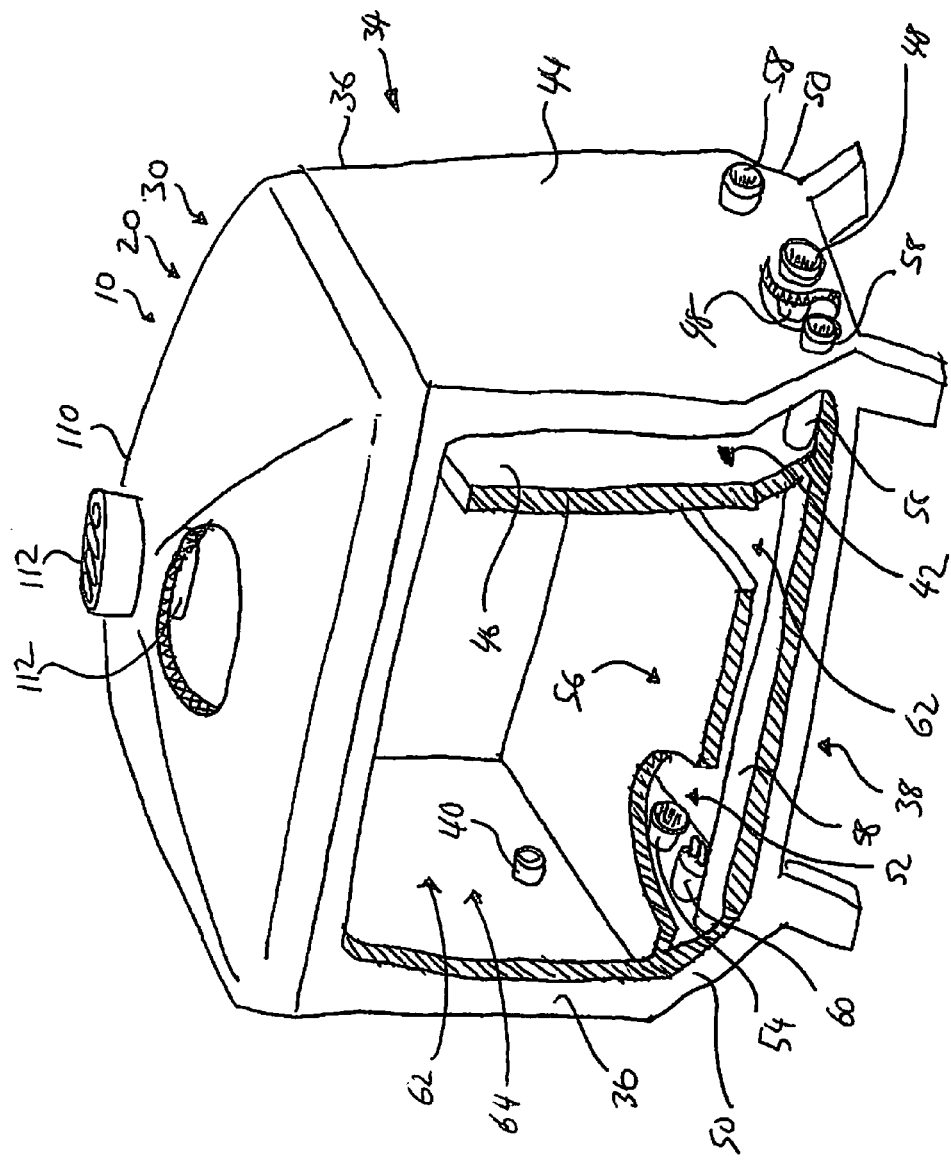
FIG. 2 is substantially a cutaway view of one embodiment of the tank with its lid of the present invention.

As substantially shown in FIGS. 2 and 4, the tank lid 110 is domed-shaped with an air ejector 112 fitted at the top of its dome to allow the operation of the invention 10 to occur at a slight negative pressure to remove any dangerous (e.g., methanol) vapours present (e.g., to reduce the potential dangers of explosion of any such fumes present within the separator 20). The tank lid 110 is placed on and secured to the tank 30 during operation of the invention 10.

Process

Figure 5:
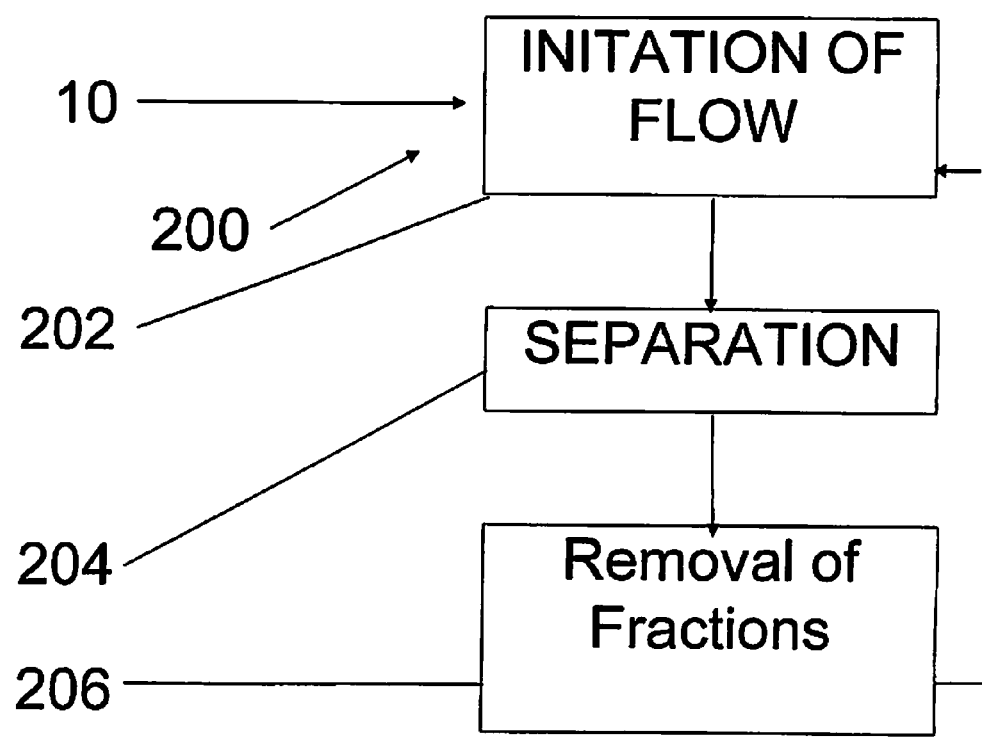
FIG. 5 is substantially a flow chart showing one embodiment of the process of operating the invention.

As substantially shown in FIG. 5, the methodology or process 200 for operating the separator could commence with step 202 initiation of flow. In this step, the tank is generally kept filled with reactor mixture from previous production batches. The tank lid is sealed upon the tank itself and the air separator pumps the atmosphere in the tank to outside of the tank so the interior of the tank generally runs under negative atmosphere to remove any accumulation of explosive gases from volatile solvents (e.g., methanol and other alcohols). The main compartment/sump of the tank is generally filled with mixture that is recently created through the operation of the transesterification reactor. The input port is opened (e.g., by an electronic control system operating the input valve) to admit a new batch of glycerine-biodiesel mixture into the tank. As this step 202 is substantially completed, the process 200 could proceed to step 204, separation.

In step 204, separation, as the transesterification reactor mixture passes into the tank of the separator, the mixture generally flows between the set(s) of stacked plates toward the weir. The lighter fraction (i.e., bio-diesel mixture), as it encounters the conical structures, is projected upward through the respective stacked conical structures and towards the respective conical aperture columns substantially moving up to the top of the tank. At the same time, as the heaver fraction (glycerine) by its density is generally forced out of and away from the conical apertures, the glycerine coalesces into globules which then move down to the trough apertures to travel down the respective trough aperture columns to the horizontal shelf where they are directed to the sump through the sump aperture. As the lighter fraction of biodiesel is forced towards the top, it could flow over the weir into the separate compartment. As the heavier fraction of glycerine moves into the sump, it could displace any lighter density liquids found in the sump (e.g., glycerine-biodiesel mixture).

As this step 204 is substantially completed, the process could generally continue onto step 206, removal of fractions.

In step 206, removal of fractions, the float switch for the separate compartment could detect the amount (e.g., level) of the separated fraction of biodiesel in the separate compartment. When the level is substantially high enough, the float switch (via the electronic controller or like device as suitably selected by one who has ordinary skill in the appropriate arts) could open the valve controlling the output port to allow biodiesel to drain (be pumped) out of the separate compartment. When the amount of biodiesel in separate compartment is generally too low, the float switch (via an electronic controller) could close the valve controlling the output port to substantially seal the output port.

During this time, the conductivity probe in the sump can be simultaneously measuring the conductivity/resistance of the liquid present in the sump. If the probe detects that the liquid has relatively high conductivity/low resistance (e.g., the presence of high concentration of glycerine in the sump liquid) then the invention (e.g. via the electronic controller) could cause the passage in sump drain to open and subsequently allow the liquid present in the sump to be removed (e.g., be drained, pumped out, etc.) of the sump. When the probe detects that the liquid in the sump has relatively low conductivity/high resistance (e.g. biodiesel is present in relatively high concentration in the sump liquid), the probe could cause the invention to close the passage in the sump drain, generally preventing the liquid from being removed from the sump.

When step 206 is generally completed, the process 200 could generally reset itself by returning to step 202.

CONCLUSION

As substantially demonstrated in the above-description, the invention could provide for an easy and inexpensive way to construct and operate a biodiesel-glycerine continuous flow separator that accomplishes the separation is a relatively short period of time utilizing a relative small footprint when compared to other separator means. In doing so, the invention places the two fractions in separate compartments and then uses electrical conductivity/resistance to determine when the concentration of glycerine is sufficient to be removed from its relative compartment.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A continuous flow separator for biodiesel formation comprising:
   (a) a tank, the tank forms a hollow interior further comprising a main compartment, weir-formed separate compartment, and a sump, the weir-formed separate compartment is formed at an end of the tank, the sump is formed at the bottom of the tank, the main compartment is located over the sump, the sump further containing a probe;
   (b) a set of horizontally stacked plates, the plates being placed in the main compartment and set over the sump, each plate features a set of conical structures and at an apex of the conical structure is a cone aperture while proximate to the base of the cone is at least one trough aperture;

wherein the plates are configured and stacked to align the cone apertures into series of cone aperture columns and to align the trough apertures into a series of trough aperture columns, the probe measuring either an electrical resistance or an electrical conductivity of a glycerine fraction in the sump which is used to control the flow of the glycerine fraction out of the sump.

2. The continuous flow separator of claim 1 wherein each plate has a set of evenly-spaced longitudinal folds with resulting peaks and troughs and a set of evenly-spaced lateral folds, the lateral folds combine with the longitudinal folds to form a set of conical structures on each of the longitudinal folds, with each trough featuring a series of trough apertures at the junctions of the lateral folds troughs and longitudinal fold troughs.

3. The continuous flow separator of claim 2 wherein the longitudinal folds of the plates are generally planar with side walls of the tank.

4. The continuous flow separator of claim 3 wherein the side walls are insulated.

5. The continuous flow separator of claim 1 wherein the tank further comprises a removable dome-shaped tank lid that allows placement of the set of horizontally stacked plates into the tank and seals the interior of the tank.

6. The continuous flow separator of claim 5 wherein the removable tank lid further compromises an air separator at the top of the dome shape that maintains a negative air pressure in the interior tank.

7. The continuous flow separator of claim 1 further comprises a horizontally-oriented shelf located proximate to the bottom to support the stacked plates and to form a sump aperture connecting the main compartment to the sump.

8. The continuous flow separator of claim 1 wherein the height of a weir of the weir-formed compartment is less than the height of the side walls of the tank but greater than the height of the plates stacked in the tank.

9. The continuous flow separator of claim 1 wherein the sump further comprises a heating means to prevent the solidification of the glycerine fraction present in the sump.

10. A methodology for operating a continuous flow separator for biodiesel formation comprising the following steps but not necessarily in the order shown:
(A) providing a tank having a hollow interior comprising a main compartment, a weir-formed separate compartment and a sump, the sump further containing a drain and a probe, the probe measures either an electrical resistance or an electrical conductivity of a liquid in a sump to control the drain, and a set of horizontally-stacked plates within the main compartment, each plate having a set of conical structures, a set of trough apertures, and a set of cone apertures, the cone aperture being located at the apex of the conical structures while the trough apertures are located at the bases of the conical structures, the set of cone apertures are aligned to form a series of cone aperture columns, the set of trough apertures are aligned to form a series of trough aperture columns;
(B) moving a glycerine-biodiesel mixture across the plates;
(C) moving a biodiesel fraction up towards the conical structures, through the conical apertures, into the series of cone aperture columns, and over the weir into the weir-formed separate compartment;
(D) moving a glycerine fraction down through the series of trough aperture columns into the sump; and
(E) obtaining a high purity glycerine fraction from the SUMP by:
(i) measuring the electrical conductivity or the electrical resistance of the liquid in the sump;
(ii) controlling the SUMP drain based on the measured electrical conductivity or the measured electrical resistance of the liquid in the sump.

11. The method of claim 10 wherein controlling the SUMP drain further comprises removing the liquid from the sump based on the level of the liquid's electrical conductivity or resistance.

12. The method of claim 10 wherein controlling the SUMP drain further comprises preventing the liquid in the sump from leaving the sump based on the level of the liquid's electrical conductivity or resistance.

13. The method of claim 10 further comprising of the step of moving the glycerine out of the cone apertures and away from the conical structure to form globules.

14. A continuous flow separator for biodiesel formation comprising:
a tank having a hollow interior further denoting a main compartment, a weir formed separate compartment, at one end of the tank, a sump being formed in the bottom of the tank with a probe that can measure an electrical conductivity or an electrical resistance of liquid present in the sump and a sump drain located in the sump, the operation of the sump drain being controlled by the electrical conductivity or the electrical resistance of a liquid present in the sump, the tank receiving a set of horizontally-stacked plate set over the sump, wherein each plate features a series of conical structures, at an apex of the conical structure is a cone aperture and proximate to the base of the conical structure is at least one trough aperture; the plates are so configured and stacked to align cone apertures line into a series of cone aperture columns to align the trough apertures into a series of trough aperture columns.

* * * * *